(12) United States Patent
Sohn et al.

(10) Patent No.: US 7,994,813 B2
(45) Date of Patent: Aug. 9, 2011

(54) SEMICONDUCTOR DEVICE CAPABLE OF TESTING A TRANSMISSION LINE FOR AN IMPEDANCE CALIBRATION CODE

(75) Inventors: Young-Hoon Sohn, Suwon-si (KR); Kwang-Il Park, Yongin-si (KR); Yong-Gwon Jeong, Uiwang-si (KR); Si-Hong Kim, Gunpo-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 0 days.

(21) Appl. No.: 12/719,953

(22) Filed: Mar. 9, 2010

(65) Prior Publication Data

US 2010/0237902 A1 Sep. 23, 2010

(30) Foreign Application Priority Data

Mar. 18, 2009 (KR) ........................ 10-2009-0023265

(51) Int. Cl.
*H03K 19/0175* (2006.01)
(52) U.S. Cl. ........................................... 326/30; 326/86
(58) Field of Classification Search .................... 326/30, 326/86; 327/108, 109, 112
See application file for complete search history.

(56) References Cited

U.S. PATENT DOCUMENTS

| | | | | |
|---|---|---|---|---|
| 6,980,020 | B2 * | 12/2005 | Best et al. ........................ | 326/30 |
| 7,408,378 | B2 * | 8/2008 | Best et al. ........................ | 326/30 |
| 7,408,379 | B2 | 8/2008 | Cho et al. | |
| 7,692,446 | B2 * | 4/2010 | Lee et al. ........................ | 326/30 |
| 7,710,144 | B2 * | 5/2010 | Dreps et al. ..................... | 326/30 |
| 2006/0126403 | A1 | 6/2006 | Byun et al. | |
| 2007/0146004 | A1 | 6/2007 | Park et al. | |
| 2008/0143377 | A1 * | 6/2008 | Cho et al. ........................ | 326/30 |
| 2008/0304336 | A1 * | 12/2008 | Kim et al. ................ | 365/189.11 |

FOREIGN PATENT DOCUMENTS

| | | |
|---|---|---|
| JP | 2007-179725 | 7/2007 |
| KR | 1020060066835 | 6/2006 |
| KR | 100656456 | 12/2006 |
| KR | 100656461 | 12/2006 |
| KR | 1020080046919 | 5/2008 |
| KR | 1020070116363 | 12/2010 |

* cited by examiner

*Primary Examiner* — Vibol Tan
(74) *Attorney, Agent, or Firm* — F. Chau & Associates, LLC

(57) ABSTRACT

A semiconductor device includes a plurality of pads, where an external reference resistor is connected to a first one of the pads, an impedance calibrating unit configured to generate an impedance calibration code corresponding to an impedance of the reference resistor and output the impedance calibration code to a code transmitting line during a normal operating mode, and an impedance matching unit configured to perform an impedance matching operation in response to the impedance calibration code during the normal operating mode. The impedance calibrating unit is configured to output a test code to the code transmitting line in response to a test signal during a test operating mode. The impedance matching unit is configured to serialize the test code to output the serialized test code to each of the other pads in response to the test signal during the test operating mode.

19 Claims, 5 Drawing Sheets

SEMICONDUCTOR DEVICE CAPABLE OF TESTING A TRANSMISSION LINE FOR AN IMPEDANCE CALIBRATION CODE

CROSS-REFERENCE TO RELATED APPLICATION

This application claims priority under 35 U.S.C. §119 to Korean Patent Application No. 10-2009-0023265, filed on Mar. 18, 2009, the disclosure of which is incorporated by reference in its entirety herein.

BACKGROUND

1. Technical Field

Exemplary embodiments of the inventive concept relate to a semiconductor device, and more particularly to a semiconductor device capable of testing a transmission line for an impedance calibration code.

2. Discussion of Related Art

When a signal is transmitted through two transmission lines having different impedances from each other, a part of the transmitted signal may be lost. Further, the amount of signal loss may increase as the speed of signal transmission increases. Therefore, in a semiconductor device that transmits a signal at a high speed through a transmission line, the impedance of an internal transmission line should be matched with the impedance of an external transmission line.

A semiconductor device that transmits signals at high speeds through transmission lines may include an off-chip driver (OCD) and an on-die-termination circuit (ODT) for impedance matching with an external transmission line. An OCD may perform an impedance matching operation to transmit the signal without loss when the signal is output from the semiconductor device to the exterior. An ODT may perform an impedance matching operation to transmit the signal without loss when the signal is input from the exterior to the semiconductor device. Therefore, the OCD/ODT pair may prevent reflection of an transmitted signal.

An impedance characteristic of the OCD or the ODT may be calibrated to obtain a higher degree of signal integrity. The need for impedance calibration increases as the speed of signal transmission increases. A semiconductor device may include an impedance calibrating circuit to calibrate impedance of an ODT or an OCD using an external reference resistor. The impedance calibrating circuit may perform the impedance calibration of the OCD and the ODT by adjusting the magnitude of the impedance of the reference resistor.

As the number of signals input or output to or from a semiconductor device increases, so does the number of input pads and input/output pads that are provided in the semiconductor device. Each of the input pads may be connected with a corresponding ODT and each of the input/output pads may be connected with both a corresponding OCD and a corresponding ODT. Due to the increase in the number of pads, it is difficult to limit an arrangement of the pads to some specific area of the semiconductor device. Thus, the pads may be arranged in different areas of the semiconductor device along with a corresponding OCD and ODT.

An impedance calibrating circuit may use code transmitting lines to transmit a calibration code to the OCDs and ODTs that are arranged in the different areas of the semiconductor device. However, the calibration code may have been transmitted with a distortion, or a line cut or short may be present in one of the code transmitting lines.

SUMMARY

A semiconductor device according to an exemplary embodiment of the inventive concept includes a plurality of pads, an impedance calibrating unit, and an impedance matching unit. An external reference resistor is connected to a first one of the pads. The impedance calibrating unit is configured to generate an impedance calibration code corresponding to an impedance of the reference resistor and output the impedance calibration code to a code transmitting line during a normal operating mode. The impedance calibration unit is further configured to output a test code to the code transmitting line in response to a test signal in a test operating mode. The impedance matching unit performs an impedance matching operation in response to the impedance calibration code during the normal operating mode, and serializes the test code to output the serialized test code to each of the other pads in response to the test signal during the test operating mode.

The semiconductor device may further include a circuit unit that receives input data and performs a predetermined operation on the input data to output operation data during the normal operating mode, and receives a command and a test code as the input data to output the test signal, the test code and a nominal code during the test operating mode.

The impedance calibrating unit may include an impedance calibrating circuit, a test-up code multiplexer and a test-down code multiplexer. The impedance calibrating circuit may generate a calibration code that includes an up code and a down code corresponding to an impedance of the reference resistor. The test-up code multiplexer may receive the up code and a test-up code of the test code, and select the test-up code to output the selected test-up code to an up-code transmitting line of the code transmitting line in response to the test signal. The test-down code multiplexer may receive the down code and a test-down code of the test code, and select the test-down code to output the selected test-down code to a down-code transmitting line of the code transmitting line in response to the test signal.

The impedance matching unit may include at least one on-die-termination circuit that performs impedance matching on input pads of the other pads to terminate input data applied to the circuit unit in response to the calibration code, and serializes the test code to output the serialized test code to the corresponding input pads sequentially in response to the test signal during the test mode.

At least one of the on-die-termination circuits may include a first up-code multiplexer, a first up-code serializer, a first up-code combining unit and at least one up-terminating unit. The first up-code multiplexer may receive a code applied through the up-code transmitting line and a nominal up-code of the nominal code, and select and output the nominal up-code in response to the test signal. The first up-code serializer may serialize the test-up code to output the serialized test-up code. The first up-code combining unit may perform a logical combination on an output signal of the first up-code multiplexer and the serialized test-up code. The at least one up-terminating unit may be coupled in parallel between a power supply voltage and a corresponding input pad, and adjust impedance of the corresponding input pad in response to an output signal of the first up-code combining unit.

An external NMOS transistor may be coupled between the corresponding input pad and a ground voltage, where a voltage higher than a threshold voltage of the NMOS transistor is constantly applied to a gate terminal of the NMOS transistor.

At least one of the on-die-termination circuits may include a first down-code multiplexer, a first down-code serializer, a first down-code combining unit and at least one down-terminating unit.

The first down-code multiplexer may receive a code applied through the down-code transmitting line and a nominal down-code of the nominal code, and select and output the nominal down-code in response to the test signal. The first down-code serializer may serialize the test-down code to output the serialized test-down code. The first down-code combining unit may perform a logical combination on an output signal of the first down-code multiplexer and the serialized test-down code. The at least one down-terminating unit may be coupled in parallel between the corresponding input pad and a ground voltage, and adjust impedance of the corresponding input pad in response to an output signal of the first down-code combining unit.

The impedance matching unit may further include at least one off-chip driver that adjusts a driving capability of the output data received from the circuit unit to provide the output data to a corresponding output pad of the other pads in response to the calibration code during the normal operating mode, and serializes the test code to output the serialized test code to the corresponding output pads sequentially in response to the test signal during the test operating mode.

At least one of the off-chip drivers may include a second up-code multiplexer, a second down-code multiplexer, a second up-code serializer, a second down-code serializer, an output-up multiplexer, an output-down multiplexer, a second up-code combining unit, a second down-code combining unit, at least one up-driving unit and at least one down-driving unit.

The second up-code multiplexer may receive a code applied through the up-code transmitting line and a nominal up-code of the nominal code, and select and output the nominal up-code in response to the test signal. The second down-code multiplexer may receive a code applied through the down-code transmitting line and a nominal down-code of the nominal code, and select and output the nominal down-code in response to the test signal. The second up-code serializer may serialize the test-up code to output the serialized test-up code. The second down-code serializer may serialize the test-down code to output the serialized test-down code. The output-up multiplexer may receive the output data and the serialized test-up code, and select and output the serialized test-up code in response to the test signal. The output-down multiplexer may receive the output data and the serialized test-down code, and select and output the serialized test-down code in response to the test signal. The second up-code combining unit may perform a logical combination on an output signal of the second up-code multiplexer and the serialized test-up code. The second down-code combining unit may perform a logical combination on an output signal of the second down-code multiplexer and the serialized test-down code. The at least one up-driving unit may be coupled in parallel between a power supply voltage and the corresponding input pad, and adjust impedance of the corresponding input pad in response to an output signal of the second up-code combining unit. The at least one down-driving unit may be coupled in parallel between a power supply voltage and the corresponding input pad, and adjust impedance of the corresponding input pad in response to an output signal of the second down-code combining unit.

The plurality of pads may further include at least one input/output pad commonly connected to a corresponding one of the off-chip driver circuits and the on-die-termination circuits.

A semiconductor device according to an exemplary embodiment of the inventive concept includes a plurality of pads, an impedance calibrating unit, and impedance matching unit. An external reference resistor is connected to a first one of the pads. The impedance calibrating unit is connected to the other pads via a code transmitting line. The impedance calibrating unit is configured to output an impedance calibration code corresponding to an impedance of the reference resistor to the code transmitting line during a normal operating mode of the semiconductor device. The impedance calibrating unit is configured to output a test code to the code transmitting line in response to a test signal during a test operating mode. The impedance matching unit is configured to perform an impedance matching operation in response to the impedance calibration code during the normal operating mode. The impedance matching unit is configured to output the test code to at least one of the other pads via the code transmitting line in response to the test signal during the test operating mode.

The impedance calibrating unit may include an impedance calibrating circuit configured to output an up-code of the calibration code and a down-code of the calibration code, a first multiplexer configured to receive a test-up-code of the test code and the up-code and output to a first line of the code transmitting line one of the test-up-code or the up-code in response to the test signal, and a second multiplexer configured to receive a test-down-code of the test code and the down-code and output to a second line of the code transmitting line one of the test-down-code or the down-code in response to the test signal.

The semiconductor device may further include an off-chip driver (OCD) connected to a second one of the pads, wherein the OCD includes a first serializer configured to receive the test-up-code, a second serializer configured to receive the test-down-code, a first multiplexer configured to output one of a nominal-up-code or the test-up-code in response to the test signal, a second multiplexer configured to output one of operational data of the semiconductor device or an output of the first serializer in response to the test signal, a third multiplexer configured to output one of operational data of the semiconductor device or an output of the second serializer in response to the test signal, and a fourth multiplexer configured to output one of the test-down-code or a nominal-down code in response to the test signal. The OCD may further include a NAND gate configured to perform a NAND on an output of the first and second multiplexers, and a NOR gate configured to perform a NOR on an output of the third and fourth multiplexers. The OCD may further include a first transistor and a first resistor coupled in series between a power supply voltage and the second pad, the gate of the first transistor receiving the output of the NAND gate, and a second transistor and second resistor coupled in series between a ground voltage and the second pad, the gate of the second transistor receiving the output of the NOR gate.

The semiconductor device may include an on-die-termination (ODT) circuit connected to a second one of the pads, where the ODT includes a first serializer configured to receive the test-up-code, a second serializer configured to receive the test-down-code, a first multiplexer configured to output one of a nominal-up-code or the test-up-code in response to the test signal, a second multiplexer configured to output one of the test-down-code or a nominal-down code in response to the test signal, a NAND gate configured to perform a NAND on an output of the first serializer and the first multiplexer, a NOR gate configured to perform a NOR on an output of the second serializer and the second multiplexer, a first transistor and a first resistor coupled in series between a power supply voltage and the second pad, the gate of the first transistor receiving the output of the NAND gate, and a second transistor and second resistor coupled in series between a ground voltage and the second pad, the gate of the second transistor receiving the output of the NOR gate.

The semiconductor device may alternately include an on-die-termination (ODT) circuit connected to a second one of the pads, wherein the ODT includes a serializer configured to receive the test-up-code, a multiplexer configured to output one of a nominal-up-code or the test-up-code in response to the test signal, a NAND gate configured to perform a NAND on an output of the serializer and the multiplexer, a first transistor and a first resistor coupled in series between a power supply voltage and the second pad, the gate of the first transistor receiving the output of the NAND gate, and a second transistor coupled between a ground voltage and the second pad, the gate of the second transistor driven by a voltage higher than a threshold voltage of the second transistor.

A semiconductor device according to an exemplary embodiment of the inventive concept includes an operation circuit configured to perform operations on input data to output data during a normal operating mode and output the test code, a test signal, and a nominal code during a test mode, an input/output (IO) pad, an input pad, an off chip driver (OCD) circuit connected between the IO pad and the operation circuit, a first on-die-termination (ODT) circuit connected between the IO pad and the operation circuit, a second ODT circuit connected between the input pad and the operation circuit, an impedance calibrating unit configured to output one of a calibration code based on an external reference resistor or a test code along a code transmitting line in response to the test signal to at least one of the first and second ODTs or the OCD.

The operation circuit may receive a command via the IO pad and the test code via the input pad and the test mode is set in response to the command. The impedance calibrating unit may include an impedance calibrating circuit configured to generate an up-code and a down-code from the calibration code, a first multiplexer configured to output one of the up-code or a test-up code of the test code to an up-code transmitting line of the code transmitting line in response to the test signal, and a second multiplexer configured to output one of the down-code or a test-down code of the test code to a down-code transmitting line of the code transmitting line in response to the test signal.

BRIEF DESCRIPTION OF THE DRAWINGS

Exemplary embodiments of the inventive concept are described in further detail below with reference to the accompanying drawings.

DETAILED DESCRIPTION OF EXEMPLARY EMBODIMENTS

The inventive concept will now be described more fully with reference to the accompanying drawings in which exemplary embodiments thereof are shown. The inventive concept, however, may be embodied in many alternate forms and should not be construed as limited to only the exemplary embodiments set forth herein. Like numbers refer to like elements throughout the description of the figures. It will be understood that when an element is referred to as being "connected" or "coupled" to another element, it can be directly connected or coupled to the other element or intervening elements may be present.

Figure 1:
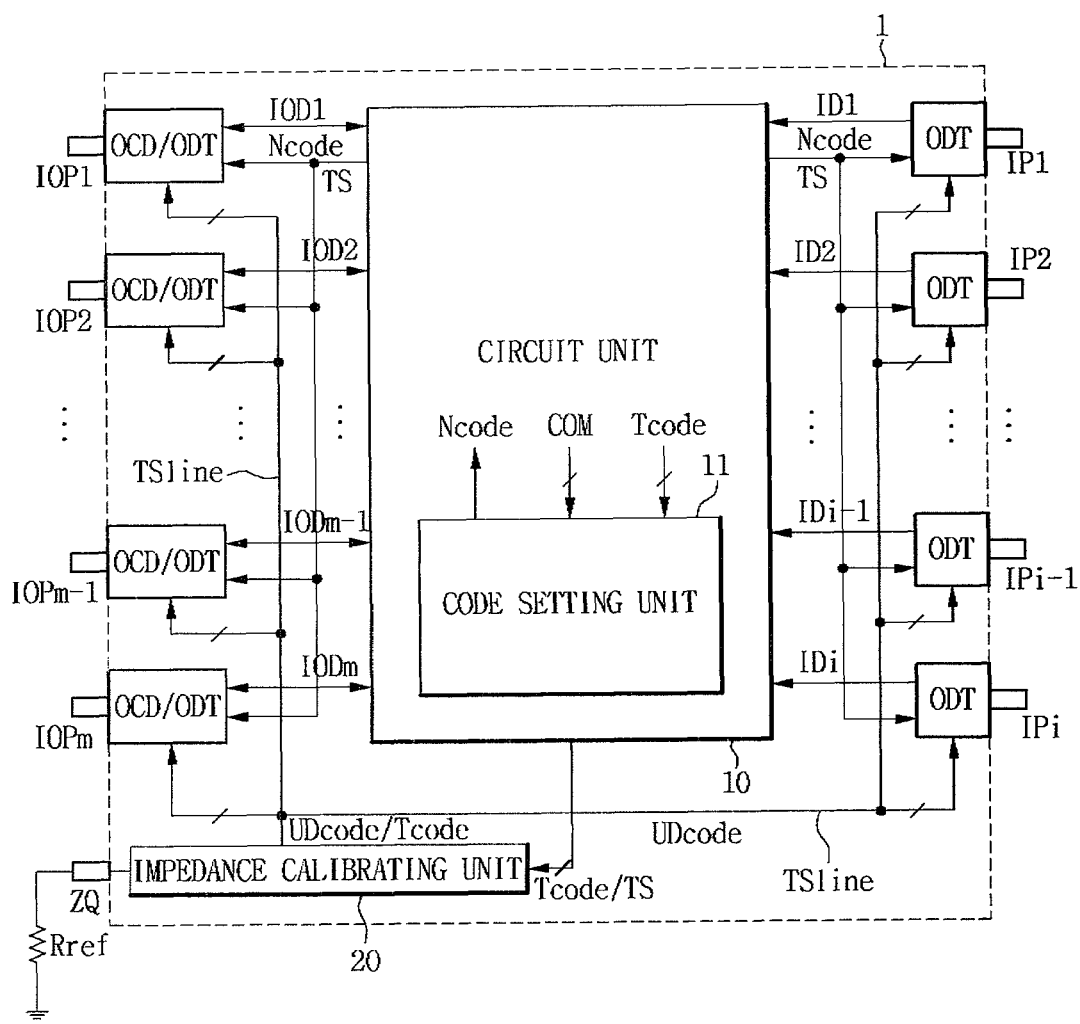
FIG. 1 is a diagram illustrating a semiconductor device according to an exemplary embodiment of the inventive concept.

FIG. 1 is a diagram illustrating a semiconductor device according to an exemplary embodiment of the inventive concept. The semiconductor device 1 of FIG. 1 includes a plurality of input pads IP1 to IPi, a plurality of input/output pads IOP1 to IOPm, a circuit unit 10, an impedance calibrating unit 20, a pad ZQ, a reference resistor Rref, a plurality of OCD/ODT circuits, and a plurality of ODT circuits, where I and m are positive integers.

The input pads IP1 to IPi input data to the circuit unit 10 and the input/output pads IOP1 to IOPm input data or output data to or from the circuit unit 10. The circuit unit 10 receives data from the input pads IP1 to IPi or the input/output pads IOP1 to IOPm and performs a predetermined operation on the data to output data to the input/output pads IOP1 to IOPm. For example, the circuit unit 10 may include a processor for executing one or more operations.

The circuit unit 10 may receive an external command COM that triggers a test mode and a test code Tcode to output a test signal TS and the test code Tcode to the impedance calibrating unit 20. The external command COM may be applied as input data ID1 to IDi through one or more of the plurality of input pads IP1 to IPi, and the test code Tcode may be applied through one or more of the plurality of input/output pads IOP 1 to IOPm. Alternately, the external command COM may be received through one or more of the input/output pads IOP1 to IOPm, and the test code Tcode may be received through one or more of the input pads IP1 to IPi. In another alternate embodiment, the external command COM and the test code Tcode are both received by one or more of the input pads IP1 to IPi or both received by one or more of the input/output pads IOP1 to IOPm.

The circuit unit 10 may include a code setting unit 11, which may output a nominal code Ncode when the external command COM triggers the test mode. The nominal code Ncode may be received and set from an external source or may be set to a predetermined value stored within the code setting unit 11. The impedance calibrating unit 20 generates an impedance calibration code UDcode corresponding to a reference resistor Rref that is coupled to the pad ZQ. The impedance calibrating unit 20 outputs the impedance calibration code UDcode to an off-chip driver (OCD) or an on-die-termination circuit (ODT) through a code transmitting line TSline. The impedance calibration code UDcode may include an up code Ucode and a down code Dcode, and each of the up code Ucode and the down code Dcode include n bits, where n is a positive integer. Further, the impedance calibrating unit 20 outputs the test code Tcode applied from the circuit unit 10 to a corresponding OCD/ODT in a test operating mode, instead of the impedance calibration code UDcode corresponding to the reference resistor Rref.

The plurality of OCDs correspond to each of the input/output pads IOP1 to IOPm, which receive the impedance calibration code UDcode through the code transmitting line TSline and perform impedance matching on input/output data IOD1 to IODm applied by the circuit unit 10 to output impedance-matched data to the exterior. The plurality of ODTs correspond to each of the input pads IP1 to IPi and the input/output pads IOP1 to IOPm, which receive the impedance calibration code UDcode through the code transmitting line TSline and perform impedance matching on the input data ID1 to IDi and the input/output data IOD1 to IODm applied from the exterior to output impedance-matched data to the circuit unit 10. For example, each of the input/output pads IOP1 to IOPm includes both the OCD and the ODT. However, each of the input/output pads IOP1 to IOPm may include only the OCD when used as an output pad for only outputting data.

At least one of the OCDs and ODTs may receive the nominal code Ncode and performs impedance matching on input data or output data during the test operating mode using the nominal code Ncode. For example, during the test operating mode, at least one of the OCDs and ODTs performs the impedance matching in response to the nominal code Ncode, instead of the impedance calibration code Udcode or the test code Tcode applied by the impedance calibrating unit 20. The nominal code Ncode may have a number of bits ranging from 1 to 2n (e.g., n is a positive integer). The OCDs and ODTs may serialize the test code Tcode having a plurality of bits applied by the impedance calibrating unit 20 and sequentially output the serialized test code to the exterior through the corresponding input pads IP1 to IPi and input/output pads IOP1 to IOPm during the test operating mode.

A semiconductor device according to an exemplary embodiment of the inventive concept including the circuit unit 10 outputs the test code Tcode to the impedance calibrating unit 20 during a test operating mode. The impedance calibrating unit 20 outputs the test code Tcode to the OCD and ODT, instead of the impedance calibration code Udcode. Further, the OCD and ODT serialize the test code Tcode, and perform impedance matching on the serialized test code Tcode to sequentially output the impedance-matched test code to the exterior in response to the nominal code Ncode.

Accordingly, it may be determined whether a code transmitting line for impedance calibration is in a normal state or not by sensing the test code Tcode output from the input pads IP1 to IPi and the input/output pads IOP1 to IOPm. For example, it can be determined whether the impedance calibration code UDcode is normally applied to the OCD and the ODT.

In FIG. 1, the impedance calibrating unit 20 is shown independently of the circuit unit 10, but the impedance calibrating unit 20 may be included in the circuit unit 10.

Figure 2:
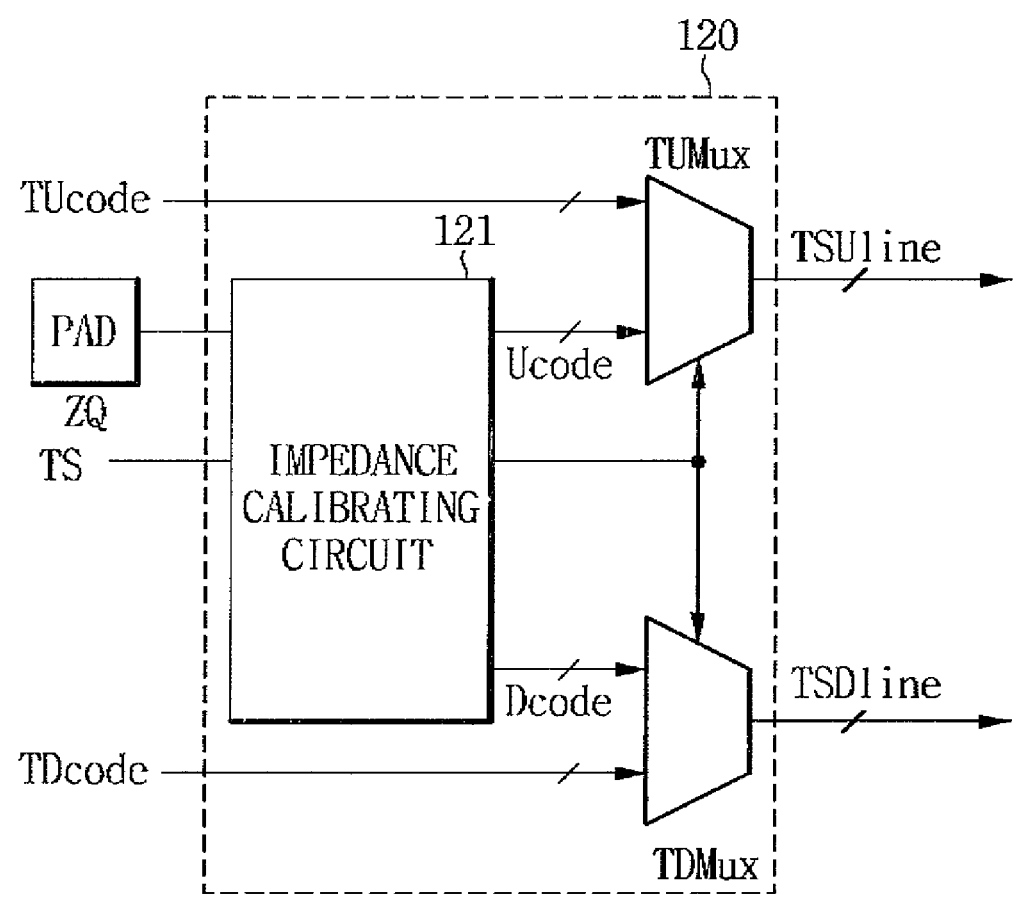
FIG. 2 is a diagram illustrating an impedance calibrating circuit shown in FIG. 1 according to an exemplary embodiment of the inventive concept.

FIG. 2 is a diagram illustrating the impedance calibrating circuit 20 shown in FIG. 1 according to an exemplary embodiment of the inventive concept. In FIG. 2, the impedance calibrating circuit 120 includes an impedance calibrating circuit 121, a test-up code multiplexer TUMux and a test-down code multiplexer TDMux. The impedance calibrating circuit 121 is coupled to the pad ZQ, which generates the impedance calibrating code UDcode corresponding to the reference resistor Rref.

The test-up code multiplexer TUmux receives an up code Ucode of the impedance calibrating code UDcode that includes the up code Ucode and a down code Dcode and a test-up code TUcode of the test code Tcode that includes the test-up code TUcode and a test-down code TDcode, and selects one of the up code Ucode and the test-up code TUcode to output the selected code to an up-code transmitting line TSUline in response to the test signal TS.

The test-down code multiplexer TDmux receives the down code Dcode of the impedance calibrating code UDcode that includes the up code Ucode and the down code Dcode and a test-down code TDcode of the test code Tcode that includes the test-up code TUcode and the test-down code TDcode, and selects one of the down code Dcode and the test-down code TDcode to output the selected code to a down-code transmitting line TSDline in response to the test signal TS.

In FIG. 1, the code transmitting line TSline may include an up-code transmitting line TSUline and a down-code transmitting line TSDline. During the test operating mode of the semiconductor device 1, the impedance calibrating circuit 120 according to an exemplary embodiment of the inventive concept outputs the test code Tcode in response to the test signal TS, instead of the impedance calibrating code UDcode output from the impedance calibrating circuit 121.

Figure 3:
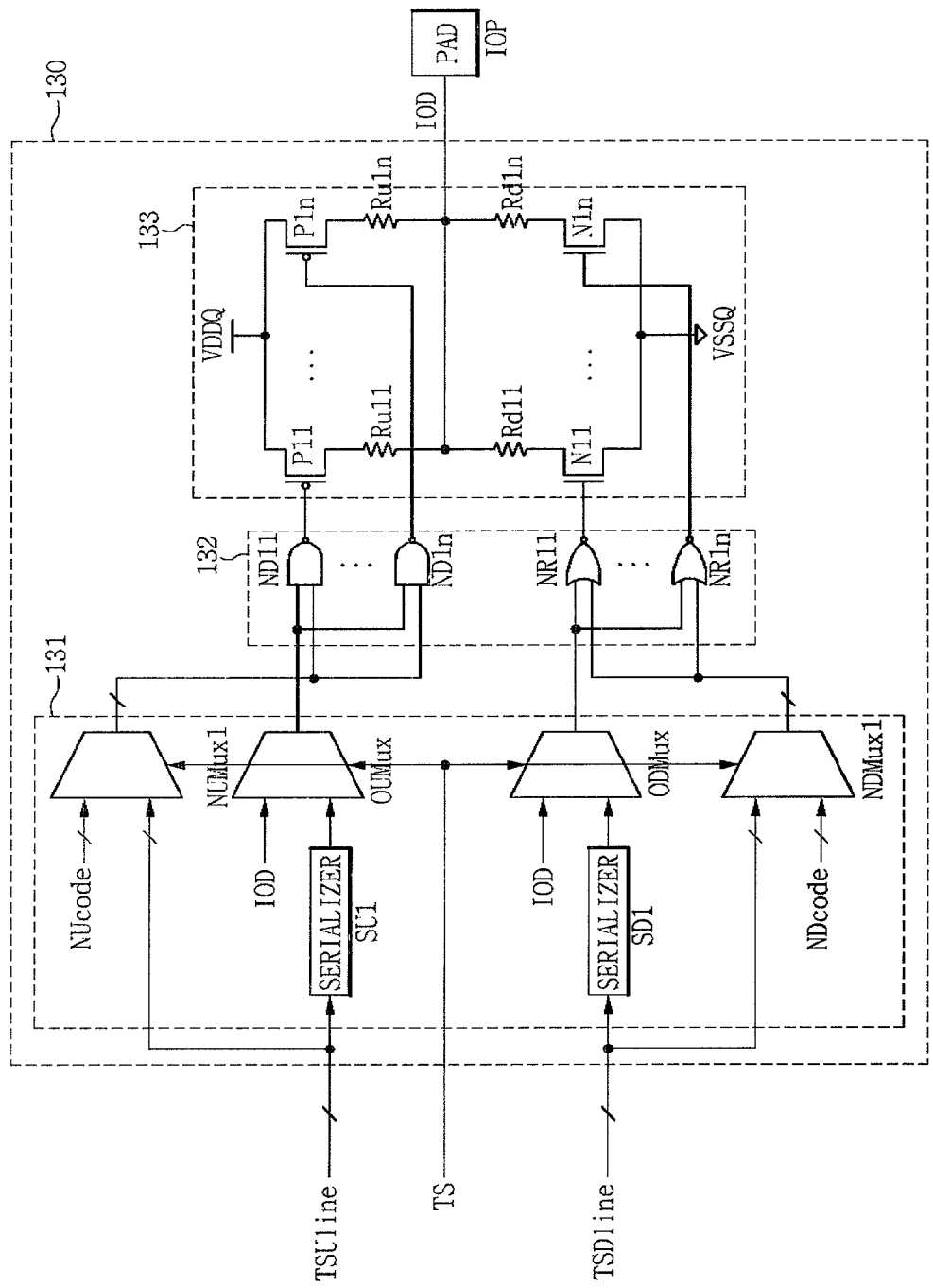
FIG. 3 is a diagram illustrating an OCD shown in FIG. 1 according to an exemplary embodiment of the inventive concept.

FIG. 3 is a diagram illustrating an OCD shown in FIG. 1 according to an exemplary embodiment of the inventive concept. The OCD 130 includes a code/data selecting unit 131, a code-combining unit 132 and at least one data driving unit 133. The code/data selecting unit 131 includes two serializers SU1 and SD1 and four multiplexers NUMux1, NDMux1, OUMux and ODMux. The two serializers SU1 and SD1 receive the test-up code TUcode and the test-down code TDcode through an up-code transmitting line TSUline and a down-code transmitting line TSDline respectively, and serialize and sequentially output the test-up code TUcode and the test-down code TDcode to an output-up multiplexer OUMux and an output-down multiplexer ODMux respectively. The output-up multiplexer OUMux receives output data OD (e.g., OD of IOD) output from the circuit unit 10 and the test-up code TUcode output from the serializer SU1, and selects and outputs one of the output data OD and the test-up code TUcode in response to the test signal TS. The output-down multiplexer ODMux receives output data OD and the test-down code TDcode output from the serializer SD1, and selects and outputs one of the output data OD and the test-down code TDcode in response to the test signal TS.

The up-code multiplexer NUMux1 receives a nominal up code NUcode of the nominal code Ncode output from the circuit unit 10 and the test-up code TUcode, and selects and outputs one of the nominal up code NUcode and the test-up code TUcode in response to the test signal TS. The down-code multiplexer NDMux1 receives the nominal down code NDcode of the nominal code Ncode and the test-down code TDcode, and selects and outputs one of the nominal down code NDcode and the test-down code TDcode in response to the test signal TS. As described above, the nominal code Ncode has a number of bits ranging from 1 to 2n (e.g., n is a positive integer). When the bits of the nominal code Ncode assigned for the nominal up code NUcode and the nominal down code NDcode number less than 2n, bits other than the assigned bits may have a logic 0 or 1. A logic 1 may be assigned to all the bits of the nominal up code NUcode and a logic 0 may be assigned to all the bits of the nominal down code NDcode. Alternately, only one bit of the nominal up code NUcode may have a logic 1, and the other bits of the nominal up code NUcode and those of the nominal down code NDcode may have logic 0. The nominal up code NUcode may be only 1 bit having a logic 1 and the nominal down code NDcode may be only 1 bit having a logic 0.

The code-combining unit 132 includes n NAND gates ND11 to ND1n and n NOR gates NR11 to NR1n, where n is a positive integer. Each of the n NAND gates ND11 to ND1n performs a NAND operation on an output signal of the up-code multiplexer NUMux1 and an output signal of the output-up multiplexer OUMux and outputs the result. Each of the n NOR gates NR11 to NR1n performs a NOR operation on an output signal of the down-code multiplexer NDMux1 and an output signal of the output-down multiplexer ODMux and outputs the result.

At least one of the data driving units 133 includes one or a plurality of up-driving units coupled in parallel between a power supply voltage VDDQ and an input/output node to which an input/output pad IOP is connected, and one or a plurality of down-driving units coupled in parallel between the input/output node and a ground voltage VSSQ. The plurality of up-driving units include up one or more transistors P11 to P1n coupled in series between the power supply voltage VDDQ and the input/output node and up resistors Ru11 to Ru1n, and a gate terminal of each of the up transistors P11 to P1n receives an output signal of a corresponding NAND gate of the n NAND gates ND11 to ND1n. The plurality of down-driving units include one or more down resistors Rd11 to Rd1n coupled in series between the input/output node and the ground voltage VSSQ and down transistors N11 to N1n, and a gate terminal of each of the down transistors N11 to N1n receives an output signal of a corresponding NOR gate of the n NOR gates NR11 to NR1n. The up transistors P11 to P1n and the down transistors N11 to N1n may be embodied by a PMOS transistor and a NMOS transistor, respectively.

The OCD 130 shown in FIG. 3 serializes the test code Tcode in response to the test signal TS, and outputs the serialized test code to the input/output pad IOP using the nominal code Ncode for impedance matching, instead of the impedance calibrating code UDcode or the test code Tcode. The nominal code Ncode is a code for driving the at least one data driving unit 133 so that the test code Tcode may be output through the input/output pad IOP. The number of bits or the values of bits of the nominal code Ncode may be set by a user. The nominal code Ncode is a code for outputting a test code Tcode during the test operating mode. When the driving capability of the data driving unit 133 is high, an external test apparatus may detect the test code Tcode through the input/output pad IOP even if the impedance matching has not completed. In at least one embodiment, all the bits of the nominal up code NUcode may be set to a logic 1 and all the bits of the nominal down code NDcode may be set to a logic 0 so that the test apparatus may detect the test code Tcode.

Figure 4:
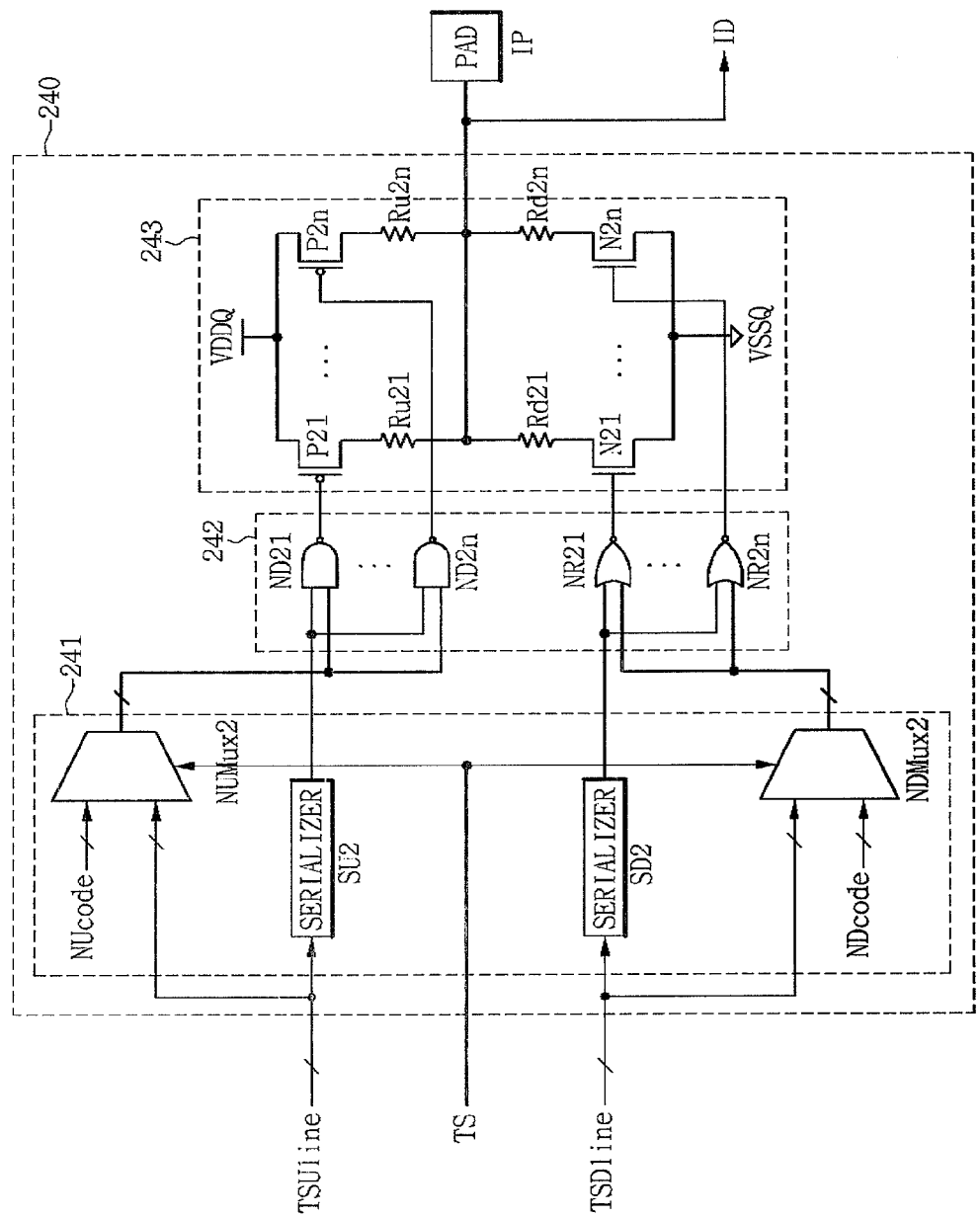
FIG. 4 is a diagram illustrating an ODT shown in FIG. 1 according to an exemplary embodiment of the inventive concept.

FIG. 4 is a diagram illustrating an ODT shown in FIG. 1 according to an exemplary embodiment of the inventive concept. The ODT shown in FIG. 4 is similar to the OCD shown in FIG. 3, which includes a code/data selecting unit 241, a code-combining unit 242 and at least one data terminating unit 243.

The ODT 240 is used for impedance matching of the input data ID. The ODT 240 includes at least one data terminating unit 243. In an exemplary embodiment, the ODT 240 as well as the OCD outputs the test code Tcode to determine whether the impedance calibration code UDcode is normally transmitted. Therefore, the ODT 240 according to an exemplary embodiment includes a code/data selecting unit 241, a code-combining unit 242 and at least one data terminating unit 243 similarly to the OCD 130. Therefore, in at least one exemplary embodiment of the inventive concept, both the OCD and the ODT may be defined as impedance matching units.

The code/data selecting unit 241 includes two serializers SU2 and SD2 and two multiplexers NUMux2, NDMux2. The two serializers SU2 and SD2 receive the test-up code TUcode and the test-down code TDcode through the up-code transmitting line TSUline and a down-code transmitting line TSDline respectively, and serialize and sequentially output the test-up code TUcode and the test-down code TDcode, similarly to the serializers SU1 and SD1 shown in FIG. 3. However, the code/data selecting unit 241 does not include an output-up multiplexer OUMux or an output-down multiplexer ODMux because the code/data selecting unit 241 does not receive the output data OD from the circuit unit 10. Similarly to the up-code multiplexer NUMux1 and the down-code multiplexer NDMux1, the up-code multiplexer NUMux2 and the down-code multiplexer NDMux2 receive a nominal up code NUcode, the test-up code TUcode, the nominal down code NDcode and the test-down code TDcode, and select and output the test-up code TUcode and the test down code TDcode in response to the test signal TS during the test operating mode.

The code-combining unit 242 includes n NAND gates ND21 to ND2n and n NOR gates NR21 to NR2n. Each of the n NAND gates ND21 to ND2n performs a NAND operation on an output signal of the up-code multiplexer NUMux2 and an output signal of the serializer SU2 and outputs the result. Each of the n NOR gates NR21 to NR2n performs a NOR operation on an output signal of the down-code multiplexer NDMux2 and an output signal of the serializer SD2 and outputs the result.

At least one of the data terminating units 243 includes one or a plurality of up-terminating units coupled in parallel between a power supply voltage VDDQ and an input node to which an input pad IP is connected, and one or a plurality of down-terminating units coupled in parallel between the input node and a ground voltage VSSQ. The plurality of up-terminating units include one or more up transistors P21 to P2n coupled in series between the power supply voltage VDDQ and the input node and one or more up resistors Ru21 to Ru2n, and a gate terminal of each of the up transistors P21 to P2n receives an output signal of a corresponding NAND gate of the n NAND gates ND21 to ND2n. The plurality of down-driving units include one or more down resistors Rd21 to Rd2n coupled in series between the input node and the ground voltage VSSQ and down transistors N21 to N2n, and a gate terminal of each of the down transistors N21 to N2n receives an output signal of the corresponding NOR gate of the n NOR gates NR21 to NR2n. The impedance-matched input data ID at the input node is applied to the circuit unit 10.

Accordingly, the ODT 240 shown in FIG. 4 serializes the test code Tcode in response to the test signal TS, and outputs the serialized test code to the input pad IP using the nominal code Ncode for impedance matching.

Figure 5:
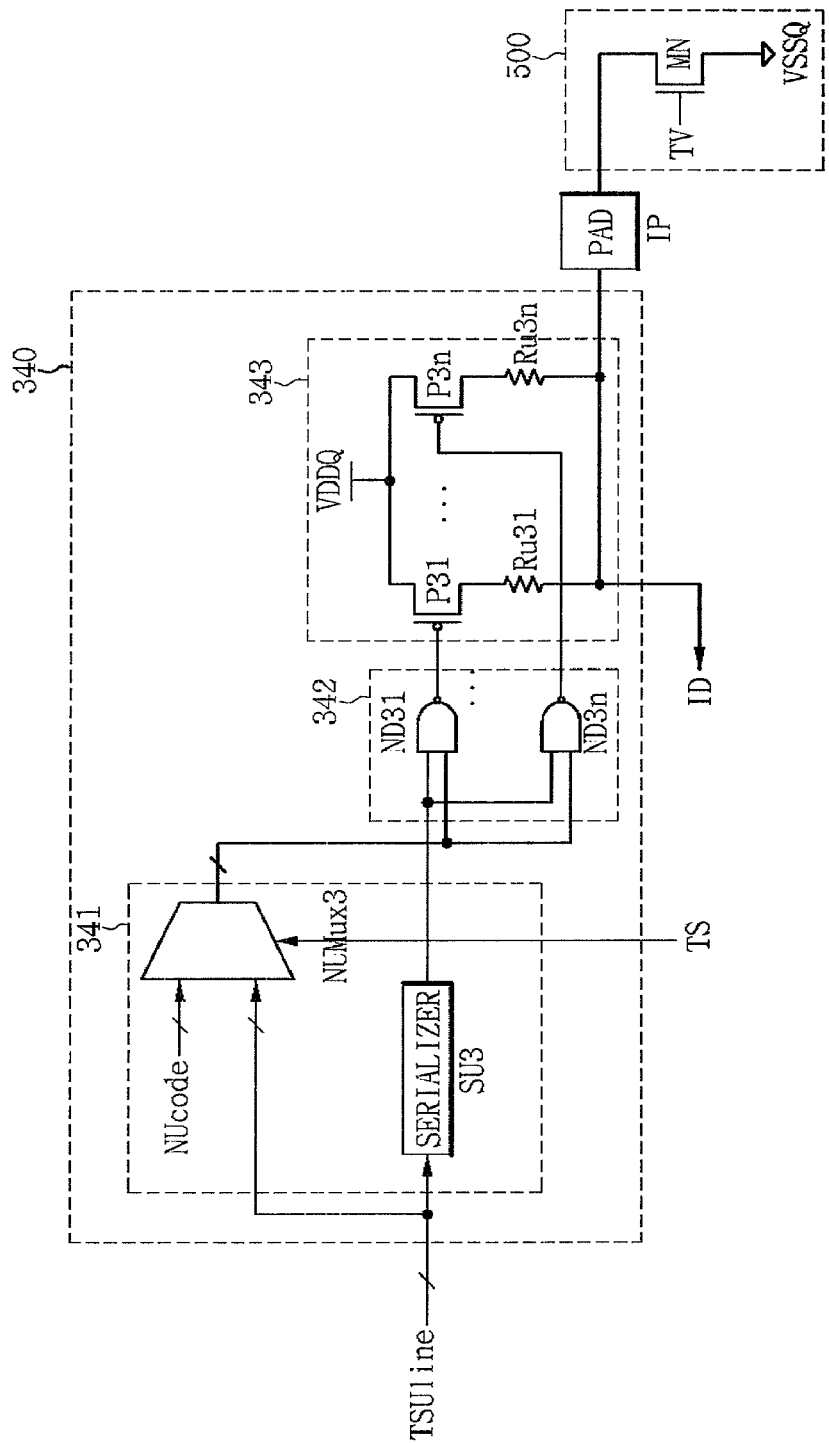
FIG. 5 is a diagram illustrating an ODT shown in FIG. 1 according to an exemplary embodiment of the inventive concept.

FIG. 5 is a diagram illustrating an ODT shown in FIG. 1 according to an exemplary embodiment of the inventive concept. In the ODT 240 of FIG. 4, at least one of the data terminating units 243 includes one or a plurality of up-terminating units and one or a plurality of down-terminating units. However, the ODT may include only the up-terminating units and not the down-terminating units. Accordingly, in the ODT 340 of FIG. 5, at least one of the data terminating units 343 includes only the up-terminating unit, which is different from the ODT 240 of FIG. 4. Further, the code/data selecting unit 341 includes one serializer SU3 and one up-code multiplexer NUMux3 because the data terminating unit 343 does not include a down-terminating unit. The code-combining unit 342 includes only n NAND gates ND31 to ND3n. The operation of the ODT 340 of FIG. 5 is similar to the operation of the ODT 240 of FIG. 4.

However, the ODT 340 of FIG. 5 is not able to output a serialized test code Tcode having a logic 0 to the input pad IP because the data terminating unit 343 does not include a down-terminating unit. For example, when the serialized test code Tcode has a logic 0, the data terminating unit 343 having only the up-terminating unit can not drive data having a logic 0. A down-driving unit 500 is included in the exterior of a semiconductor device when testing the semiconductor device using the ODT 340 to enable driving of data having a logic 0. The down-driving unit 500 may include at least one NMOS transistor MN between the input pad IP and the ground voltage VSSQ, a test voltage TV being applied to a gate terminal of the NMOS transistor MN. The test voltage TV is slightly higher than a threshold voltage of the NMOS transistor MN and may be constantly applied. For example, a voltage higher than the threshold voltage of the NMOS transistor MN by about 0.1 V may be applied as the test voltage TV. The NMOS transistor MN is always turned when the test voltage TV is constantly applied to the gate terminal of the NMOS transistor MN. For example, when the serialized test code Tcode has a logic 0, all of the up-transistors P31 to P3n of the up-terminating unit of the data terminating unit 343 are turned off, and the input node ID outputs a signal having a logic low via the down-driving unit 500. However, when the serialized test code Tcode has a logic 1, at least one up transistor of the up-transistors P31 to P3n is turned on in response to the nominal up code NUcode, and the input node ID outputs a signal having a logic high level because the NMOS transistor MN of the down-driving unit 500 has a relatively lower driving capability than the up transistors due to the test voltage TV.

In FIG. 5, the down-driving unit 500 is shown independently of the test apparatus, but the down-driving unit 500 may be included in the test apparatus. Further, the data terminating unit 243 and 343 in FIG. 4 and FIG. 5 function as a data driving unit as well as a data terminating unit because the data terminating units 243 and 343 may output a serialized test code Tcode to the exterior during the test operating mode.

In FIGS. 4 and 5, only the ODT corresponding to the input pad IP is described. However, the ODT corresponding to an input/output pad IOP may operate as described above. Further, in the above, the nominal code Ncode is described as being received from the circuit unit 10, but the nominal code Ncode may be pre-stored in an OCD and/or an ODT.

As described above, in a semiconductor device according to at least one exemplary embodiment of the inventive concept, the impedance calibrating unit 20 receives the test code Tcode from the circuit unit 10 and outputs the test code Tcode, and each of the OCD and the ODT serializes the test code and outputs the serialized test code to the input pad IP and the input/output pad IOP. Therefore, the semiconductor device may confirm a digital value whether the impedance calibrating code UDcode is normally applied to the plurality of OCDs and the ODTs through a code transmitting line for impedance calibrating code. When the impedance calibrating code UDcode has 2n bits, the code transmitting line for impedance calibrating code may be tested by performing a maximum of 2n tests.

A semiconductor device according to at least one embodiment of the inventive concept is capable of testing a transmission line for impedance calibration code by setting an impedance calibration code output from an impedance calibrating circuit as a test code, and serially outputting it to the exterior through each of OCDs and ODTs to test a code transmitting line.

Having described exemplary embodiments of the inventive concept, it should be understood that the invention is not limited to the disclosed embodiments, but, on the contrary, is intended to cover various modifications and equivalent arrangements included within the spirit and scope of the disclosure.

What is claimed is:

1. A semiconductor device, comprising:
   a plurality of pads, wherein an external reference resistor is connected to a first one of the pads;
   an impedance calibrating unit configured to generate an impedance calibration code corresponding to an impedance of the reference resistor and output the impedance calibration code to a code transmitting line during a normal operating mode, and
   wherein the impedance calibrating unit is configured to output a test code to the code transmitting line in response to a test signal during a test operating mode; and
   an impedance matching unit configured to perform an impedance matching operation in response to the impedance calibration code during the normal operating mode, and
   wherein the impedance matching unit is configured to serialize the test code to output the serialized test code to each of the other pads in response to the test signal during the test operating mode.

2. The semiconductor device according to claim 1, further comprising:
   a circuit unit configured to receive input data and perform a predetermined operation on the input data to output operational data during the normal operating mode, and
   wherein the circuit unit is configured to receive a command and the test code as the input data to output the test signal, the test code and a nominal code during the test operating mode.

3. The semiconductor device according to claim 2, wherein the impedance calibrating unit comprises:
   an impedance calibrating circuit configured to generate a calibration code that includes an up code and a down code corresponding to an impedance of the reference resistor;
   a test-up code multiplexer configured to receive the up code and a test-up code of the test code, and select the test-up code to output the selected test-up code to an up-code transmitting line of the code transmitting line in response to the test signal; and
   a test-down code multiplexer configured to receive the down code and a test-down code of the test code, and select the test-down code to output the selected test-down code to a down-code transmitting line of the code transmitting line in response to the test signal.

4. The semiconductor device according to claim 3, wherein the impedance matching unit comprises:
   at least one on-die-termination (ODT) circuit configured to perform impedance matching on input pads of the other pads to terminate input data applied to the circuit unit in response to the calibration code, and
   wherein the at least one one ODT is configured to serialize the test code to output the serialized test code to the corresponding input pads sequentially in response to the test signal during the test mode.

5. The semiconductor device according to claim 4, wherein at least one of the on-die-termination circuits comprise:
   a first up-code multiplexer configured to receive a code applied through the up-code transmitting line and a nominal up-code of the nominal code, and configured to select and output the nominal up-code in response to the test signal;
   a first up-code serializer configured to serialize the test-up code to output the serialized test-up code;
   a first up-code combining unit configured to perform a logical combination on an output signal of the first up-code multiplexer and the serialized test-up code; and
   at least one up-terminating unit coupled in parallel between a power supply voltage and the corresponding input pad, and configured to adjust impedance of the corresponding input pad in response to an output signal of the first up-code combining unit.

6. The semiconductor device according to claim 5, wherein an external NMOS transistor is coupled between the corresponding input pad and a ground voltage, wherein a voltage higher than a threshold voltage of the NMOS transistor is constantly applied to a gate terminal of the NMOS transistor.

7. The semiconductor device according to claim 5, wherein at least one of the on-die-termination circuits comprises:
a first down-code multiplexer configured to receive a code applied through the down-code transmitting line and a nominal down-code of the nominal code, and configured to select and output the nominal down-code in response to the test signal;
a first down-code serializer configured to serialize the test-down code to output the serialized test-down code;
a first down-code combining unit configured to perform a logical combination on an output signal of the first down-code multiplexer and the serialized test-down code; and
at least one down-terminating unit coupled in parallel between the corresponding input pad and a ground voltage, and configured to adjust impedance of the corresponding input pad in response to an output signal of the first down-code combining unit.

8. The semiconductor device according to claim 4, wherein the impedance matching unit further comprises:
at least one off-chip driver configured to adjust a driving capability of the output data received from the circuit unit to provide the output data to a corresponding output pad of the other pads in response to the calibration code in the normal operating mode, and configured to serialize the test code to output the serialized test code to the corresponding output pads sequentially in response to the test signal during the test operating mode.

9. The semiconductor device according to claim 8, wherein at least one of the off-chip drivers comprise:
a second up-code multiplexer configured to receive a code applied through the up-code transmitting line and a nominal up-code of the nominal code, and configured to select and output the nominal up-code in response to the test signal;
a second down-code multiplexer configured to receive a code applied through the down-code transmitting line and a nominal down-code of the nominal code, and configured to select and output the nominal down-code in response to the test signal;
a second up-code serializer configured to serialize the test-up code to output the serialized test-up code;
a second down-code serializer configured to serialize the test-down code to output the serialized test-down code;
an output-up multiplexer configured to receive the output data and the serialized test-up code, and configured to select and output the serialized test-up code in response to the test signal;
an output-down multiplexer configured to receive the output data and the serialized test-down code, and configured to select and output the serialized test-down code in response to the test signal;
a second up-code combining unit configured to perform a logical combination on an output signal of the second up-code multiplexer and the serialized test-up code;
a second down-code combining unit configured to perform a logical combination on an output signal of the second down-code multiplexer and the serialized test-down code;
at least one up-driving unit coupled in parallel between a power supply voltage and the corresponding input pad, and configured to adjust impedance of the corresponding input pad in response to an output signal of the second up-code combining unit; and
at least one down-driving unit coupled in parallel between a power supply voltage and the corresponding input pad, and configured to adjust impedance of the corresponding input pad in response to an output signal of the second down-code combining unit.

10. The semiconductor device according to claim 8, wherein the plurality of pads further comprise at least one input/output pad commonly connected to a corresponding one of the off-chip driver circuits and the on-die-termination circuits.

11. A semiconductor device, comprising:
a plurality of pads, wherein an external reference resistor is connected to a first one of the pads;
an impedance calibrating unit connected to the other pads via a code transmitting line
wherein the impedance calibrating unit is configured to output an impedance calibration code corresponding to an impedance of the reference resistor to the code transmitting line during a normal operating mode of the semiconductor device, and
wherein the impedance calibrating unit is configured to output a test code to the code transmitting line in response to a test signal during a test operating mode; and
an impedance matching unit configured to perform an impedance matching operation in response to the impedance calibration code during the normal operating mode, and
wherein the impedance matching unit is configured to output the test code to at least one of the other pads via the code transmitting line in response to the test signal during the test operating mode,
wherein the impedance calibrating unit comprises:
an impedance calibrating circuit configured to output an up-code of the calibration code and a down-code of the calibration code;
a first multiplexer configured to receive a test-up-code of the test code and the up-code and output to a first line of the code transmitting line one of the test-up-code or the up-code in response to the test signal; and
a second multiplexer configured to receive a test-down-code of the test code and the down-code and output to a second line of the code transmitting line one of the test-down-code or the down-code in response to the test signal.

12. A semiconductor device, comprising:
a plurality of pads, wherein an external reference resistor is connected to a first one of the pads;
an impedance calibrating unit connected to the other pads via a code transmitting line,
wherein the impedance calibrating unit is configured to output an impedance calibration code corresponding to an impedance of the reference resistor to the code transmitting line during a normal operating mode of the semiconductor device,
wherein the impedance calibrating unit is configured to output a test code to the code transmitting line in response to a test signal during a test operating mode;
an impedance matching unit configured to perform an impedance matching operation in response to the impedance calibration code during the normal operating mode,
wherein the impedance matching unit is configured to output the test code to at least one of the other pads via the code transmitting line in response to the test signal during the test operating mode; and
an off-chip driver (OCD) connected to a second one of the pads, wherein the OCD comprises:

a first serializer configured to receive a test-up-code of the test code;

a second serializer configured to receive a test-down-code of the test code;

a first multiplexer configured to output one of a nominal-up-code or the test-up-code in response to the test signal;

a second multiplexer configured to output one of operational data of the semiconductor device or an output of the first serializer in response to the test signal;

a third multiplexer configured to output one of operational data of the semiconductor device or an output of the second serializer in response to the test signal; and a fourth multiplexer configured to output one of the test-down-code or a nominal-down code in response to the test signal.

13. The semiconductor device of claim 12, wherein the OCD further comprises:

a NAND gate configured to perform a NAND on an output of the first and second multiplexers; and a NOR gate configured to perform a NOR on an output of the third and fourth multiplexers.

14. The semiconductor device of claim 13, wherein the OCD further comprises:

a first transistor and a first resistor coupled in series between a power supply voltage and the second pad, the gate of the first transistor receiving the output of the NAND gate; and a second transistor and second resistor coupled in series between a ground voltage and the second pad, the gate of the second transistor receiving the output of the NOR gate.

15. A semiconductor device, comprising:

a plurality of pads, wherein an external reference resistor is connected to a first one of the pads;

an impedance calibrating unit connected to the other pads via a code transmitting line, wherein the impedance calibrating unit is configured to output an impedance calibration code corresponding to an impedance of the reference resistor to the code transmitting line during a normal operating mode of the semiconductor device, wherein the impedance calibrating unit is configured to output a test code to the code transmitting line in response to a test signal during a test operating mode;

an impedance matching unit configured to perform an impedance matching operation in response to the impedance calibration code during the normal operating mode, wherein the impedance matching unit is configured to output the test code to at least one of the other pads via the code transmitting line in response to the test signal during the test operating mode; and an on-die-termination (ODT) circuit connected to a second one of the pads, wherein the ODT comprises:

a serializer configured to receive a test-up-code of the test code;

a multiplexer configured to output one of a nominal-up-code or the test-up-code in response to the test signal;

a NAND gate configured to perform a NAND on an output of the serializer and the multiplexer;

a first transistor and a first resistor coupled in series between a power supply voltage and the second pad, the gate of the first transistor receiving the output of the NAND gate; and a second transistor coupled between a ground voltage and the second pad, the gate of the second transistor driven by a voltage higher than a threshold voltage of the second transistor.

16. The semiconductor device of claim 15, further comprising:

a second serializer configured to receive a test-down-code of the test code;

a second multiplexer configured to output one of the test-down-code or a nominal-down code in response to the test signal;

a NOR gate configured to perform a NOR on an output of the second serializer and the second multiplexer; and a second transistor and second resistor coupled in series between a ground voltage and the second pad, the gate of the second transistor receiving the output of the NOR gate.

17. A semiconductor device, comprising:

an operation circuit configured to perform operations on input data to output data during a normal operating mode and output a test code, a test signal, and a nominal code during a test mode;

an input/output (IO) pad;

an input pad;

an off chip driver (OCD) circuit connected between the IO pad and the operation circuit;

a first on-die-termination (ODT) circuit connected between the IO pad and the operation circuit;

a second ODT circuit connected between the input pad and the operation circuit;

an impedance calibrating unit configured to output one of a calibration code based on an external reference resistor or a test code along a code transmitting line in response to the test signal to at least one of the first and second ODTs or the OCD.

18. The semiconductor device according to claim 17, wherein the operation circuit receives a command via the IO pad and the test code via the input pad and the test mode is set in response to the command.

19. The semiconductor device according to claim 17, wherein the impedance calibrating unit comprises:

an impedance calibrating circuit configured to generate an up-code and a down-code from the calibration code;

a first multiplexer configured to output one of the up-code or a test-up code of the test code to an up-code transmitting line of the code transmitting line in response to the test signal; and a second multiplexer configured to output one of the down-code or a test-down code of the test code to a down-code transmitting line of the code transmitting line in response to the test signal.

* * * * *